United States Patent [19]

Johnson et al.

[11] Patent Number: 5,699,941

[45] Date of Patent: Dec. 23, 1997

[54] METHOD AND APPARATUS FOR IMPROVED REGULATION OF FLOW OF PARTICULATE MATTER

[76] Inventors: Paul S. Johnson, 1505 Eastview, Fort Worth, Tex. 76134; Daniel J. Johnson, 4007 Yorkshire Dr., Stillwater, Okla. 74074

[21] Appl. No.: 416,307

[22] Filed: Apr. 4, 1995

[51] Int. Cl.⁶ .................................................. B67D 3/00
[52] U.S. Cl. ....................... 222/486; 222/504; 222/548; 222/564; 137/625.31
[58] Field of Search ...................... 137/625.31; 251/118; 222/486, 504, 548, 555, 564

[56] References Cited

U.S. PATENT DOCUMENTS

| | | | |
|---|---|---|---|
| 1,592,471 | 7/1926 | Smolensky | 137/625.31 |
| 1,761,595 | 6/1930 | Smolensky | 137/625.31 |
| 2,443,071 | 6/1948 | Honerkamp et al. | 137/625.31 X |
| 3,132,769 | 5/1964 | Zehrbach | 222/548 X |
| 4,030,641 | 6/1977 | Bailey et al. | 222/504 X |
| 4,271,001 | 6/1981 | Spencer et al. | 222/564 X |
| 4,526,199 | 7/1985 | Heitmann | 137/625.31 |
| 4,554,943 | 11/1985 | Claney et al. | 137/625.31 X |
| 4,674,537 | 6/1987 | Bergmann | 137/625.31 |
| 4,702,692 | 10/1987 | Burns et al. | 137/625.31 X |
| 4,944,428 | 7/1990 | Gmür et al. | 222/55 |
| 5,038,973 | 8/1991 | Gmür | 222/56 |

FOREIGN PATENT DOCUMENTS 2450395  10/1980  France .................... 137/625.31

*Primary Examiner*—Andres Kashnikow
*Assistant Examiner*—Kenneth Bomberg
*Attorney, Agent, or Firm*—Melvin A. Hunn

[57] ABSTRACT

A method and apparatus is provided for regulating the flow of rates of particulate matter. The invention includes a flow gate with a generally cylindrical body having a flowpath defined there through. A stator member is provided in fixed position relative to the cylindrical body. The stator member has a plurality of alternating tapered vein portions and inlet portions. A rotor member is interfaced with the stator member. The rotor member has a plurality of alternating stock portions and outlet port portions. The rotary coupling is utilized to couple the rotor member and the stator member. A position actuator is provided for receiving at least one control input and producing a corresponding displacement of the rotor member. A mechanical coupling is provided between the position actuator and the rotor member. The flow gate is utilized to obtain a particular flow rate within a range of available flowrates by determining the relative positions of the inlet ports of the stator member and the outlet ports of the rotor member.

13 Claims, 12 Drawing Sheets

"A-A"

\* - Sections between 1 and 2 may be replaced with transfer function in Figure 8

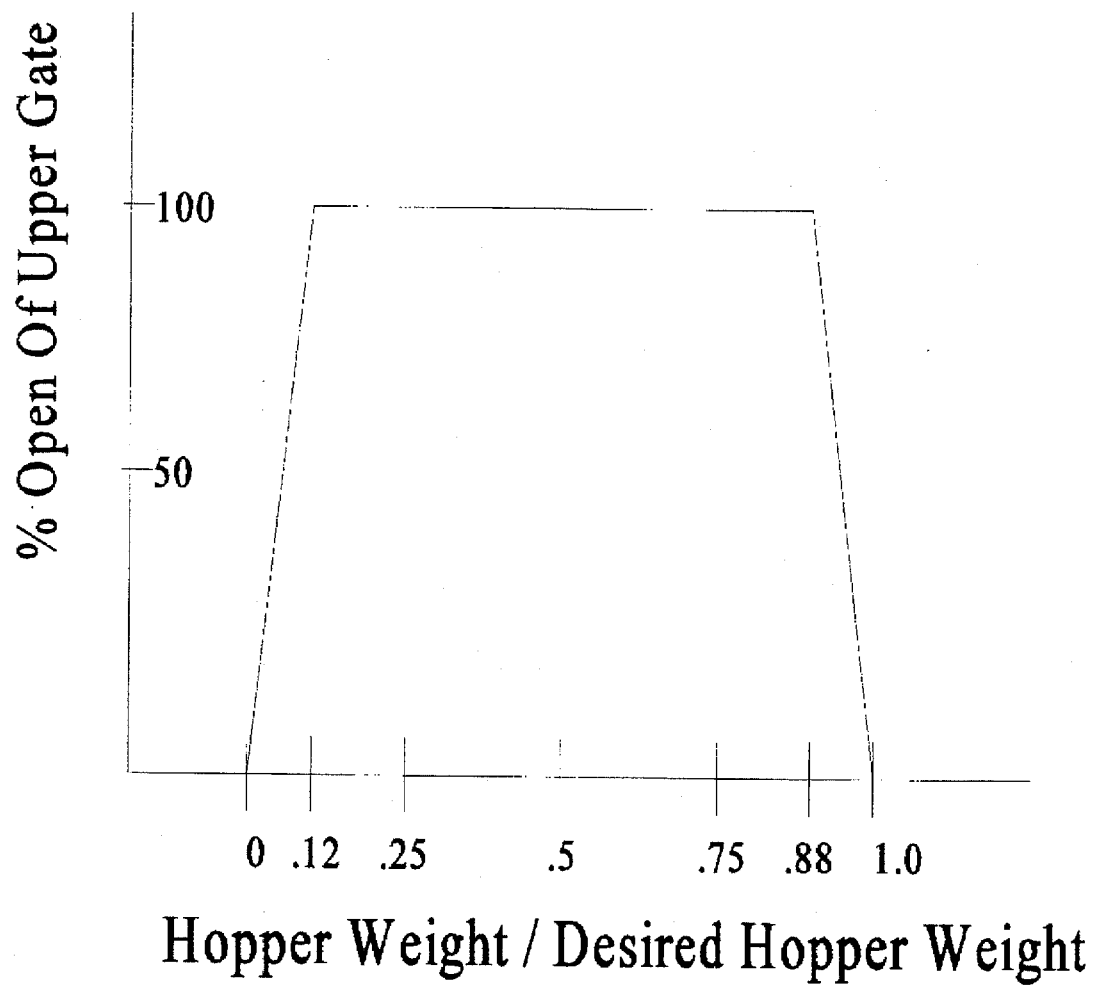
Figure 9 - Modulating Valve Transfer Function

METHOD AND APPARATUS FOR IMPROVED REGULATION OF FLOW OF PARTICULATE MATTER

BACKGROUND OF THE INVENTION

1. Field of the Invention

The present invention relates generally to an improved flow control device and in particular to an improved flow control device for use in regulating flow of particulate matter. This invention relates generally to solid granule or powdered material throttling gates particularly used in the bottom of holding or weighing hoppers and for controlling the flow through connecting spouting.

2. Description of the Prior Art

Throttling type solid and powdered material control valves are characterized by an ability to precisely control unidirectional flow through a flow opening, or openings, which are generally adjustable in size to suit the needed flow capacity. Such valves may be suitable for controlling grains of all types, granule, and certain powdered type materials (hereinafter collectively referred to as "particulate matter"). Prior art gates are grouped into "slide type" and "butterfly type" designs.

Slide gates consist of two similar frames held apart by the thickness, plus clearance, of a solid plate that is made to slide between the two frames. When the plate is positioned between the frames, the gate is closed and will not allow any material to flow through the frames. When the plate is pulled out from the frames, the material will pass through where the plate had been. The outside part of the frame has to support the plate and any material that will be resting on the plate when loaded. The plate has to be heavy enough to support any material that will be resting on it. The length or width of the plate determines the strength and length of the power device that is used to move the plate to open and close it in the frame. The larger the plate gate the stronger and longer the power device has to be, on a direct proportional basis. The larger the gate the longer the time required to open and close the gate. This does not allow for good control of the gate opening and closing for any position between fully closed or fully opened.

Butterfly gates consist of a round frame with two round solid shafts mounted on the outside perimeter of the frame. It is perpendicular to the opening axis, 180 degrees from each other. The gate plate consists of several overlapping plates that are hinged at one end on the round shafts. Half of the plates are mounted on one shaft and the other half are mounted on the other shaft is the opposite. The plates are rounded in shape on the outside edge so that when the gate is closed the plate matches the circumference of the frame. When the gate is closed the gate plates mesh together from both directions and close off the opening. When the gate is open the plates separate and swing back away from the opening. This type of gate is expensive to make and is limited as to the amount of weight the moving plates can support.

SUMMARY OF THE INVENTION

The principal objective of the present invention is to provide an improved method and apparatus for throttling material held in hoppers, and connecting spouting. This will allow for better and quicker control of the material flow in a smaller area, and with less power required to move the gate plate from an open to closed position and vice versa than the prior art devices. This is particularly useful in throttling material in a weighing operation where the weighing sequences must be made in a very accurate and concise method.

Additional objects, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A and 5B is a flowchart representation of a software routine which may be utilized to accurately weigh particulate matter in a weighing apparatus.

FIG. 9 is a graphical representation of a transfer function which may be utilized with the present invention.

DETAILED DESCRIPTION OF THE INVENTION

Figure 1:
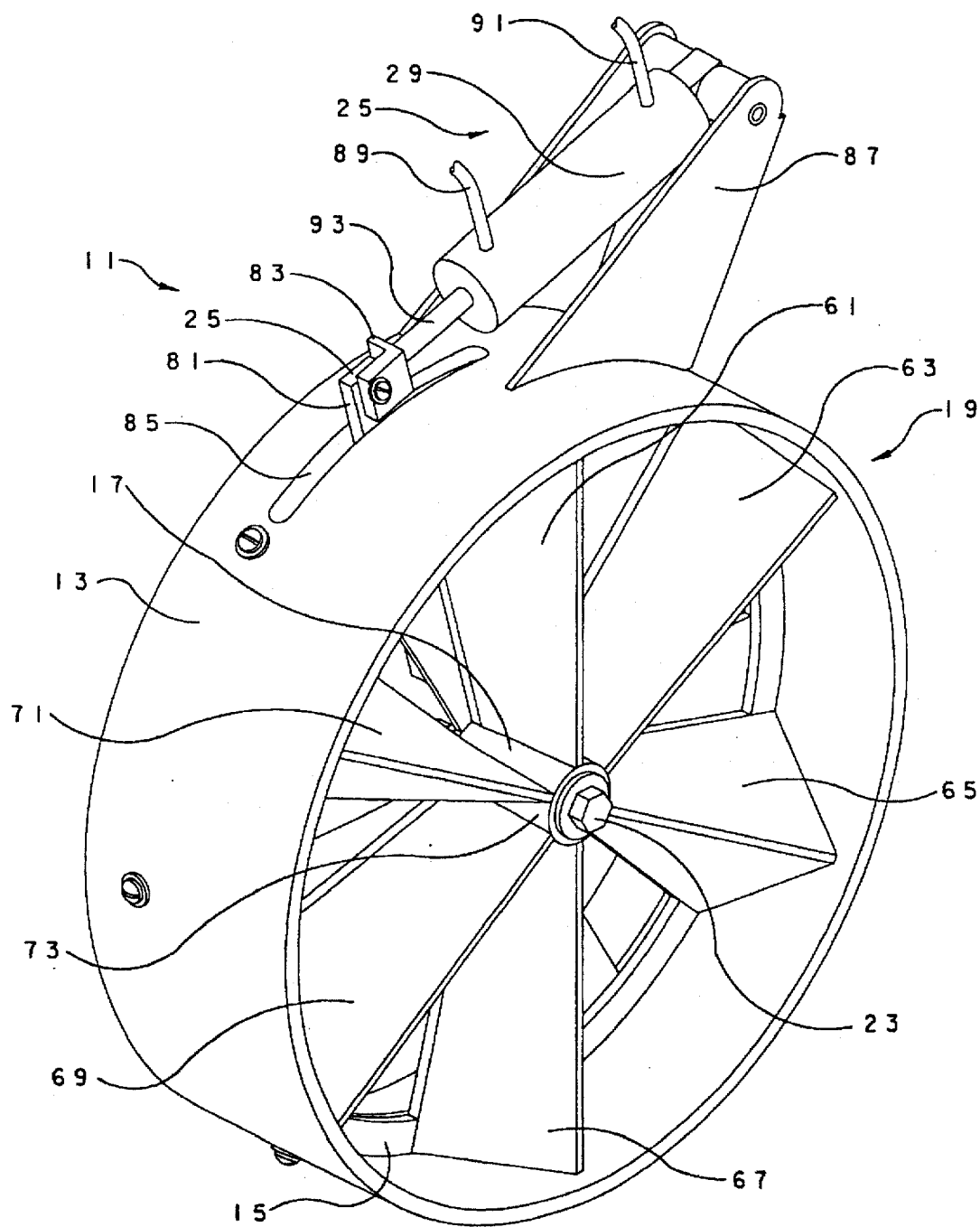
FIG. 1 is a perspective view of the inlet side of the rotary throttling gate of the present invention.

The rotary throttling gate 11 of the present invention is made up of the following components, which will be described in detail below:

A. Outside Support Frame 13

B. Mounting Plate 15

C. Center Support Hub 17

D. Support and Directing Vanes 19

E. Gate Plate 21

F. Gate Support Rod 23

G. Control Arm 25

H. SUPPORT BEARINGS 27

I. Support Bracket and Operating Cylinder 29

A. OUTSIDE SUPPORT FRAME 13:

This is preferably a flat metal sheet whose thickness, width, and length is decided by the required diameter size of the gate. The flat metal sheet is rolled into the required circumference and the ends are welded together.

B. MOUNTING PLATE 15:

This is a flat plate whose thickness is determined by the diameter size of the gate. The plate is cut into a circle with the same circumference as the inside of the matching outside support frame. There is a hole drilled in the center of the plate, whose size is determined by the diameter of the gate. The number of gate openings and the configuration in which they are laid out are predetermined according to the functionality of the gate. The openings are "pie" shaped with a predetermined width dependent on the layout configuration. The opening edges closest to the center of the plate are laid out on the circumference of a predetermined diameter circle. The edge of the opening furthest from the center of the plate will be laid out on the circumference of a circle less in diameter than the plate diameter by a predetermined amount. This mounting plate will be welded into the inner circumference of the outside support frame 13 with the distance from one edge to be determined by the diameter of the gate.

C. CENTER SUPPORT HUB 17:

This is a piece of steel tubing with an outside and an inside circumference to be determined by the functionality of the gate. The length of the shaft will be determined by the diameter of the gate. This support shaft will be welded onto the center of the mounting plate 15 on the same side as the support and directing vanes 19, which is designated as the top side of the gate.

D. SUPPORT AND DIRECTING VANES 19:

These are pieces of plate steel whose thickness, width, and length will be determined by the diameter and functionality of the gate. Their purpose is to provide the support from the outside support frame 13 to the center support shaft and direct the material into the openings. They are welded on to the mounting plate 15 at the edge of the blank area flush to the opening. They are pulled together at the top and welded. The two pieces form a sloped vane that is the same height as the center support hub 17. The vanes are then welded to the center support hub 17 and the outside support frame 13.

E. GATE PLATE 21:

This is a flat plate that is cut and shaped exactly like the mounting plate 15, except it is less in diameter by a predetermined amount.

F. GATE SUPPORT ROD 23:

This is a round solid shaft whose diameter is determined by the diameter and functionality of the gate. It is as long as the center support hub 17 plus the thickness of the gate plate 21, thrust bearing, washer, and nut. One end of the rod is threaded for a nut. This rod is inserted into the center support hub 17 flush with the top and welded in place on the top side.

G. CONTROL ARM 25:

This is a flat bar whose length and thickness are determined by the diameter of the gate. This bar is attached onto the bottom of the gate plate 21 and is long enough to extend out through a slot in the outside support frame 13. This arm can be operated manually to open or close the gate or can be hooked up to an actuating system to be controlled remotely. The remote controls can be a simple push button operation or can be automated to be under the control of a data processing system.

H. SUPPORT BEARINGS 27:

All bearings described will have sizes determined by the diameter and functionality of the gate. There will be a thrust bearing mounted on the gate support rod 23 directly under the gate plate 21. There will be roller bearings mounted on the perimeter of the outside support frame 13 directly under the gate plate 21. The gate plate 21 is supported by these bearings and are the adjusting mechanism by which the gate plate 21 is forced against the bottom of the mounting plate 15 forming a seal against leakage when the gate is closed. The bearings are adjusted so that there is sufficient pressure to seal the gate but also enough clearance to allow the gate plate 21 to move freely.

I. SUPPORT BRACKET AND OPERATING CYLINDER 29:

If the gate is to be remotely operated it will be equipped with the properly sized cylinder and supporting bracket for proper operation.

The rotary throttling gate is a throttling gate actuatable by manual means or by a remote controlled cylinder. This gate can be installed on the bottom of a holding, or weighing hopper, by means of flanges adapted to both. It also can be installed between sections of connecting spouting to control the flow of material through the spouting.

The gate is mounted where the mounting plate with support and directing vanes 19 are on the inside of the hopper, or inflow position. With the rotary gate in the closed position the blank portions of the gate plate 21 cover over the openings in the mounting plate 15 and the material is held in the hopper in a static condition. When the rotary "pie" gate is opened, either partially or completely, the gate plate 21 is rotated to where the blank spaces on the gate plate 21 are moved away from the openings in the mounting plate 15 and the material is allowed to flow through the gate by passing over the support and directing vanes 19 into the openings in the mounting and gate plates 15, 21. When the gate is closed the gate plate 21 is rotated to where the blank places in the gate plate 21 move over and cover the openings in the mounting plate 15. This shuts off the openings where the material can no longer flow.

This process can be done with less power, more control, and in less space than other gate designs. It is particularly adapted for use in controlling the flow of material in a weighing operation. This gate can be installed on the bottom of a holding hopper, above a weighing hopper. This gate can also be installed on the bottom of the weighing hopper. When the gates are controlled by a computerized digital operation the result is very concise and accurate operation.

The aforementioned components of the rotary throttling gate 11 will now be described in detail with reference to the Figures.

Figure 2:
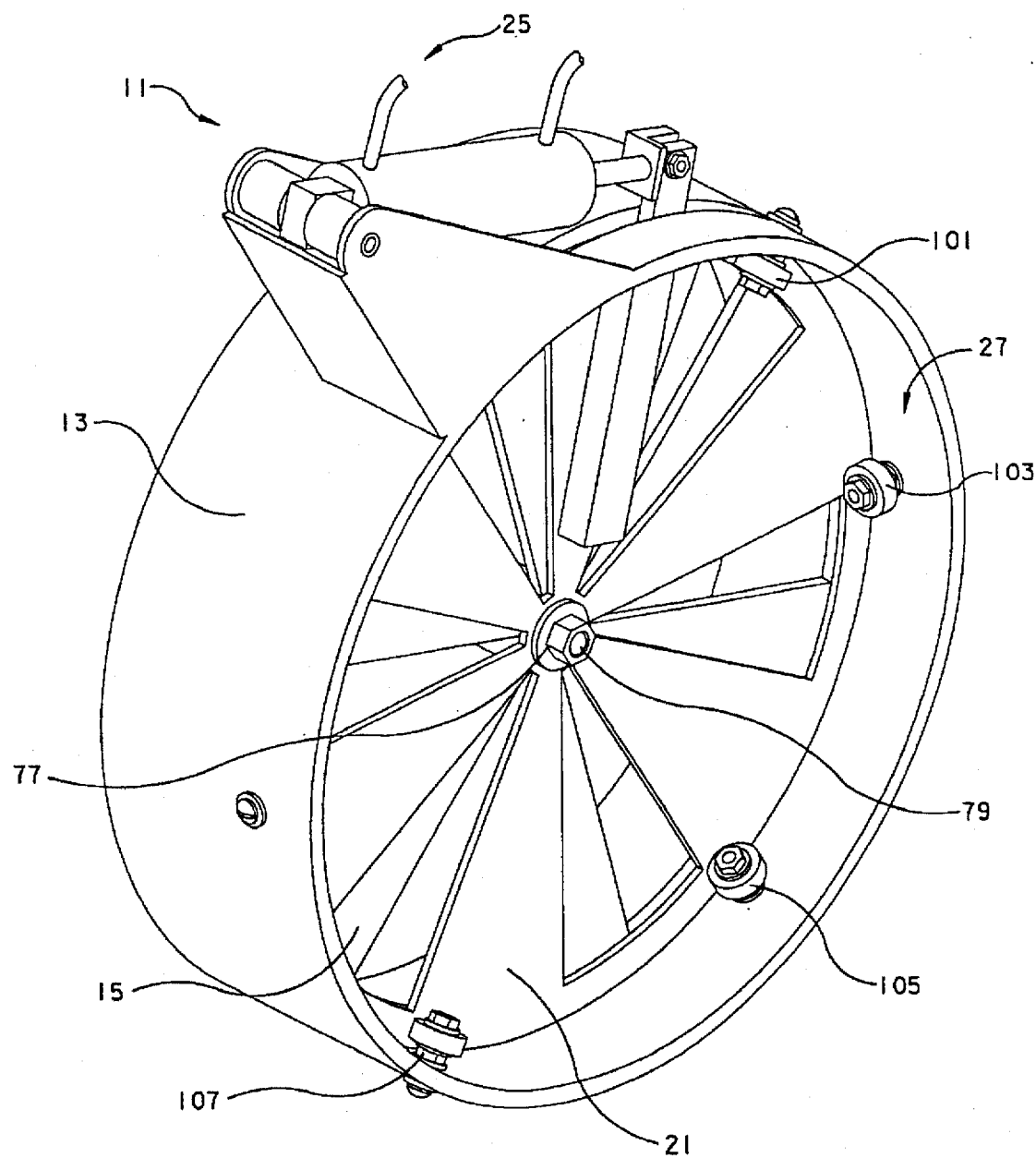
FIG. 2 is a perspective view of the outlet side of the rotary throttling gate of the present invention.

FIG. 1 is a perspective view of the preferred embodiment of the rotary throttling gate 11 of the present invention. This view depicts the input side of rotary throttling gate 11. In contrast, FIG. 2 is a perspective view of the output side of rotary throttling gate 11. Particulate matter flows through rotary throttling gate 11 from the inlet side to the outlet side. Rotary throttling gate 11 may be utilized to entirely block the flow of particular matter, to restrict the flow of particulate matter, or to allow full flow of particulate matter. Rotary throttling gate 11 is adjustable over a range of positions between a fully open position and a fully closed position to allow for variable flowrates for particulate matter passing therethrough.

Figure 3A:
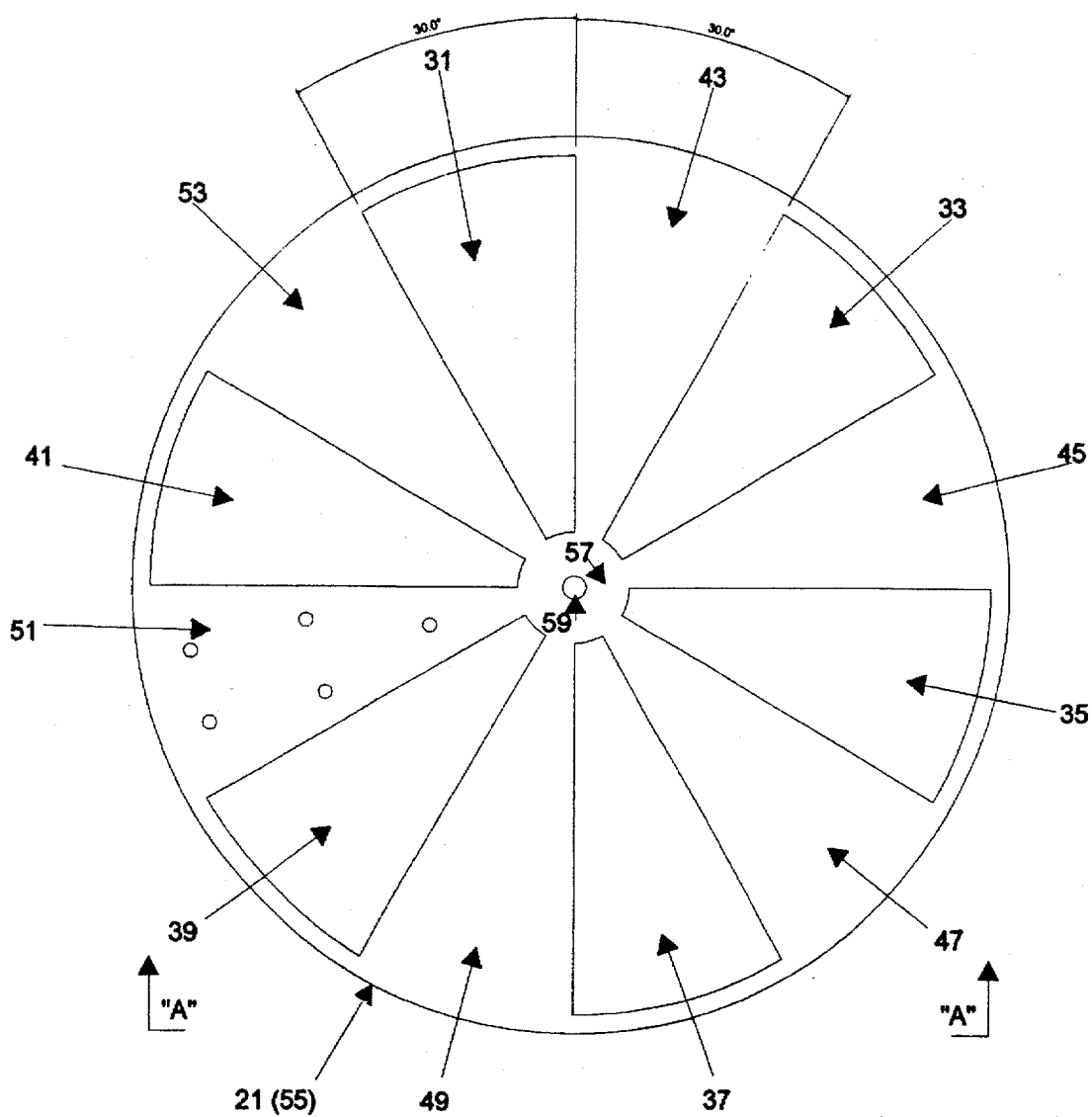
FIG. 3 is plan view of the gate plate of the rotary throttling valve of the present invention.
Figure 3B:
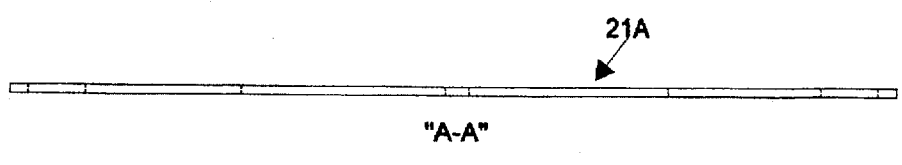

As is shown in both FIGS. 1 and 2, rotary throttling gate 11 includes outside support frame 13 which defines a cylindrical shape, and which allows for easy coupling of rotary throttling gate 11 into a particulate flow line. Preferably, mounting plate 15 is located at an intermediate position within the cylinder defined by outside support frame 13. In the preferred embodiment, mounting plate 15 is immobilized relative to outside support frame 13. During operation of rotary throttling gate 11, mounting plate 15 remains stationary. In the preferred embodiment of the present invention, rotary throttling gate 11 includes a plurality of "pie" shaped openings which may be obscured in whole or in part by gate plate 21, which also includes a plurality of "pie" shaped openings which may be completely, partially, or not at all aligned with the pie-shaped openings of mounting plate 15. In the view of FIG. 2, the pie-shaped openings of gate plate 21 are depicted as being partially aligned with the pie-shape openings of mounting plate 15. The shape and dimensions of the mounting plate 15 and gate plate 21 may be more readily understood with reference to FIG. 3, which is a perspective view of gate plate 21. As shown therein, six generally pie-shaped openings 31, 33, 35, 37, 39, and 41 are formed within a cylindrical metal plate 55. Solid regions 43, 45, 47, 49, 51, and 53 are interspersed between the pie-shaped openings. A hub region 57 is maintained at the center of cylindrical disk 55. A central port 59 is formed therein. This allows for the passage of a mechanical coupling therethrough. As is depicted in the view of FIG. 3, in a six opening gate the pie-shaped openings define a 30 degree arc, and are located every 60 degrees about the circle defined by cylindrical sheet 55. The solid portions are likewise defined at 30° arcs.

In the preferred embodiment of the present invention, a plurality of support and directing vanes 19 are provided within rotary throttling gate 11. These support and directing vanes 19 are depicted in the view of FIG. 1. Directing vanes 61, 63, 65, 67, and 69 are defined within rotary throttling gate 11. Preferably, they are fixed in position relative to outside support frame 13 and mounting plate 15, preferably by weldment of the support and directing vanes 19 to outside support frame 13 and mounting member plate 15. The support and directing vanes 19 each span a predetermined arc, and are substantially coextensive with the solid portions of mounting plate 15. Each of the support and directing vanes 19 is generally triangular in longitudinal section view. Each of the support and directing vanes 19 define a wedge shape which directs the flow of particulate matter through rotary throttling gate 11, and which distribute some of the load from particulate matter acting upon support and directing vanes 19 to outside support frame 13. While the support and directing vanes 19 are welded at their outer peripheral portions to the inner surface of outside support frame 13, and at their inner peripheral surface, they are welded to center support hub 17. In the preferred embodiment of the present invention, center support hub 17 includes a section of steel tubing 73 which has a diameter which is defined by the width of rotary throttling gate 11, and gate support rod 23 which extends within steel tubing 73 (both of which are depicted in the view of FIG. 1), and a thrust bearing (not depicted), washer 77, and nut 79 (which are depicted in the view of FIG. 2). The center support hub 17 and gate support rod 23 cooperate to allow the angular displacement of gate plate 21 relative to mounting plate 15 in order to allow the complete overlap, partial overlap, and no overlap of pie-shape openings within mounting plate 15 and gate plate 21.

The angular displacement of gate plate 21 relative to mounting plate 15 is accomplished by movement of control arm 25 by operating cylinder 29. The control arm 25 includes a flat bar which is secured to gate plate 21, a mechanical coupling 83 between control arm 25 and operating cylinder 29, and a slot 85 provided through outer support frame 13. Angular displacement of control arm 25 by operating cylinder 29 will cause the angular displacement of gate plate 21 relative to mounting plate 15, to allow complete overlap, partial overlap, and no overlap between gate plate 21 and mounting plate 15. Preferably, operating cylinder 29 is secured in position relative to outside support frame 13 by support bracket 87. Preferably operating cylinder 29 includes a cylindrical cavity (not depicted), a piston head (not depicted), and a displacement rod 93 which extends outward from operating cylinder 29 and is mechanically linked to control arm 25. Operating cylinder 29 includes control fluid lines 89, 91 which are utilized to supply control fluid (such as hydraulic fluid, air, or gas) to each side of the piston head within the cylinder of operating cylinder 29. Those skilled in the art will appreciate that operating cylinder 29 is a conventional mechanism, which allows for control of the position of displacement rod 93 by adjusting the pressure differential across the piston head of operating cylinder 29.

A plurality of support bearings 27 are provided to facilitate the angular displacement of gate plate 21 relative to mounting plate 15. Preferably, these bearings constitute thrust bearings. In the view of FIG. 2, support bearings 101, 103, 105, and 107 are depicted, with other particular thrust bearings being obscured in the view of FIG. 2. Preferably, the support bearings 27 are arranged symmetrically about outside support frame 13, and include a rotary bearing surface which engage gate plate 21 to allow it to move freely in response to displacement of control arm 25 by operating cylinder 29.

Viewed broadly, outside support frame 13 constitutes a generally cylindrical body which defines a flowpath having an inlet and an outlet side. The mounting plate 15 constitutes a stator member which is fixed in position relative to the generally cylindrical body. The support and directing vanes 19 constitute a plurality of tapered vane portions which are alternated with inlet port portions. The center support hub 17 constitutes a rotary coupling between the rotary member and the stator member. The operating cylinder 29 constitutes a position control valve which receives at least one control input and which produces a corresponding displacement. The displacement rod 93 and control arm 25 constitute a mechanical coupling between the position control valve and the rotor member. These components cooperate to allow for a particular flowrate within a range of available flowrates by providing a particular control input to the position control valve to determine the relative positions of the inlet ports of the stator member and outlet ports of the rotor member.

Figure 4:
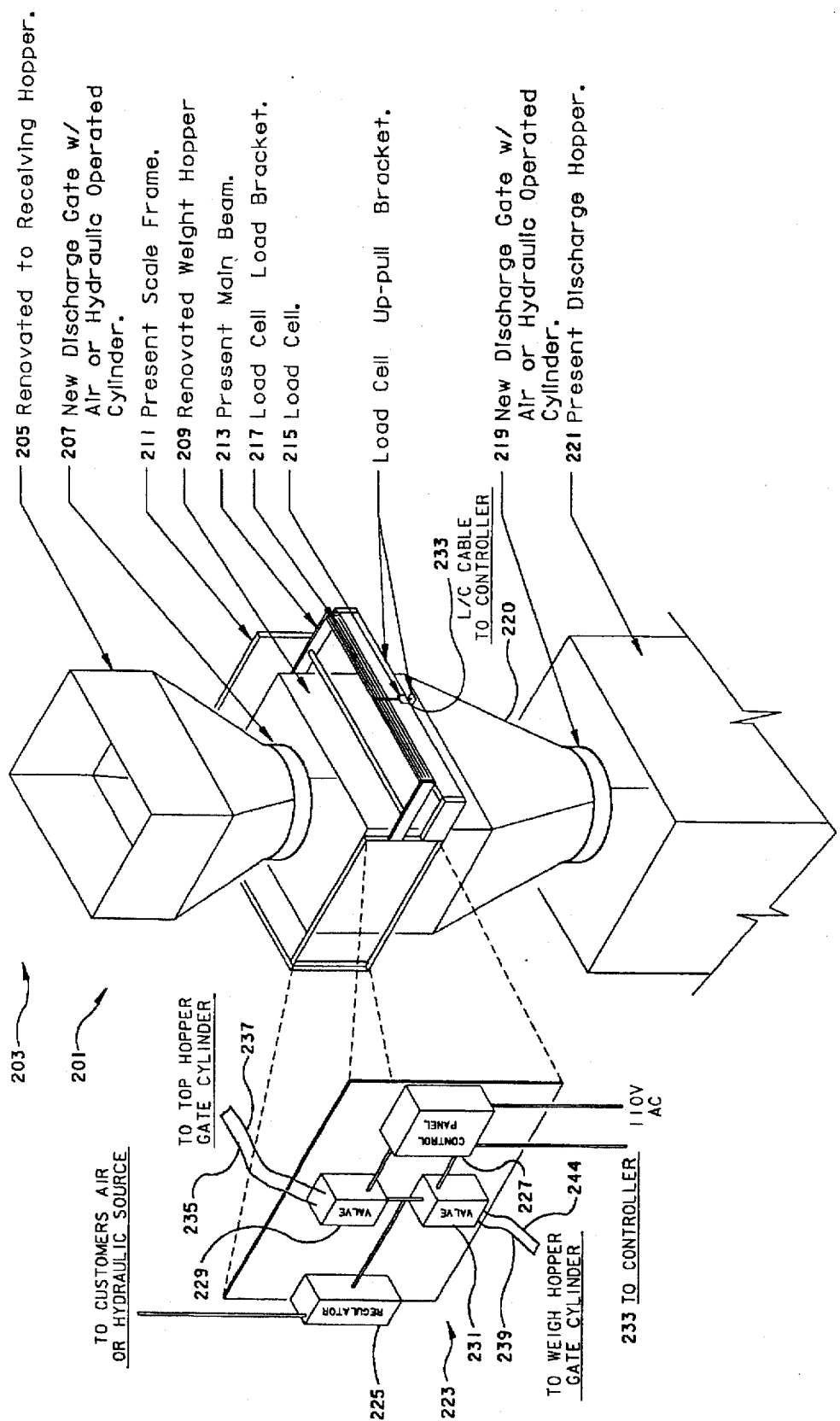
FIG. 4 is a perspective and block diagram view of a weighing hopper equipped with rotary throttling valves in accordance with the present invention.

The improved rotary throttling gate 11 of the present invention may be utilized in particulate matter handling systems, such as weighing hoppers and the like. FIG. 4 is a perspective and block diagram depiction of a weighing hoper utilizing the rotary throttling gate 11 of the present invention.

As is shown, weighing apparatus 201 is adapted for receiving particulate matter 203, which is urged downward by gravitational force through weighing apparatus 201. The particulate matter 203 is received at receiving hopper 205, which serves as an input hopper for receiving particulate matter from trucks, silos, conveyer belts, and the like. Upper rotary throttling gate 207 is coupled to the lower portion of receiving hopper 205, and is in gravity-driven flow communication with receiving hopper 205. When upper rotary throttling gate 207 is fully or partially opened, the particulate matter 203 within receiving hopper 205 is allowed to fall into a weight hopper 209 which is suspended within scale frame 211, as is conventional. A load cell 215 may be mechanically coupled between the main beam 213 of scale frame 211 and weight hopper 209, and is secured in position by load cell bracket 217. Load cell 215 operates to provide an electrical signal which is indicative of the weight of the particulate matter 203 which is within weight hopper 209. This electrical signal is communicated to control system 223 via cable 233. Additionally, lower rotary throttling gate 219 is coupled to the lower portion of weighing hopper 209, and controls the discharge of particulate matter 203 from weighing hopper 209 to discharge hopper 221 in response to control signals.

Preferably, control system 223 receives compressed air or pressurized hydraulic fluid from a source, and passes it through regulator 225. The compressed air or pressurized fluid is supplied to electrically-actuable valves 229, 231 which are under the control of a microprocessor located within control panel 227. Preferably, the microprocessor within control panel 227 supplies electrical commands to the valve or valves within electrically-actuable valves 229, 231 in order to provide a predetermined pressure differential to upper and lower rotary throttling gates 207, 219. The pressure differential is supplied to upper rotary throttling gate 207 via control lines 235, 237. A predetermined pressure differential is supplied to lower rotary throttling gate 219 via control lines 239, 241. Program instructions resident in the memory of the microprocessor within control panel 227 may be utilized to determine the relative position of the mounting plate 15 and gate plate 21 of the upper and lower rotary throttling gates 207, 219, in order to open, close, or partially open the rotary throttling gates 207, 219. Preferably, control panel 227 includes an interface to allow the operator to set the operating parameters for weighing apparatus 201. During ordinary operation, upper rotary throttling gate 207 is maintained in a fully closed condition until receiving hopper 205 is completely filled with particulate matter 203. Then, upper rotary throttling gate 207 is fully opened to allow the particulate matter 203 within receiving hopper 205 to fall into weighing hopper 209. Load cell 215 generates an electrical signal which is indicative of the weight of the particulate matter 203 within weighing hopper 209. This electrical signal is provided as an input to the microprocessor within control panel 227. Preferably, the microprocessor is programmed to allow a predetermined weight of material to pass to discharge hopper 221. If the signal provided by load cell 215 indicates that not enough particulate matter is present within weighing hopper 209, the operator may add additional particulate matter to weighing hopper 209 through receiving hopper 205 and upper rotary throttling gate 207. Once a sufficient quantity (or mass) of particulate matter is contained within weighing hopper 209, the upper rotary throttling gate 207 fully closes, and the lower rotary throttling gate 219 fully opens to allow discharge of that particular quantity (or mass) of particulate matter 203 to a storage bin, truck, or the like. This process is sequentially repeated, and exact measurements of the weight or mass of particulate matter 203 delivered through weighing apparatus 201 may be obtained.

In particular uses, a feedback loop may be established between the weight or mass of particulate matter within weight hopper 209 and a delivery mechanism which provides particulate matter to receiving hopper 205. As the weight or mass of particulate matter within weight hopper 209 approaches a predetermined weight threshold, the microprocessor within control panel 227 may actuate electrically-actuated valve 229 to partially and incrementally close the flowpath through upper rotary throttling gate 207. In this manner, very precise control can be obtained over the weight or mass of particulate matter within weighing hopper 209, since increasingly smaller amounts of particulate matter can be allowed to pass from receiving hopper 205 to weighing hopper 209 once the microprocessor within control panel 227 determines from the data provided by load cell 215 that a predetermined weight or mass threshold is being approached. This great precision can be obtained utilizing the rotary throttling gate of the present invention since any fractional amount of flow between fully opened and fully closed conditions can be obtained through hydraulic, pneumatic, or electrical control of the operating cylinders associated with the rotary throttling gates.

Figure 5A:
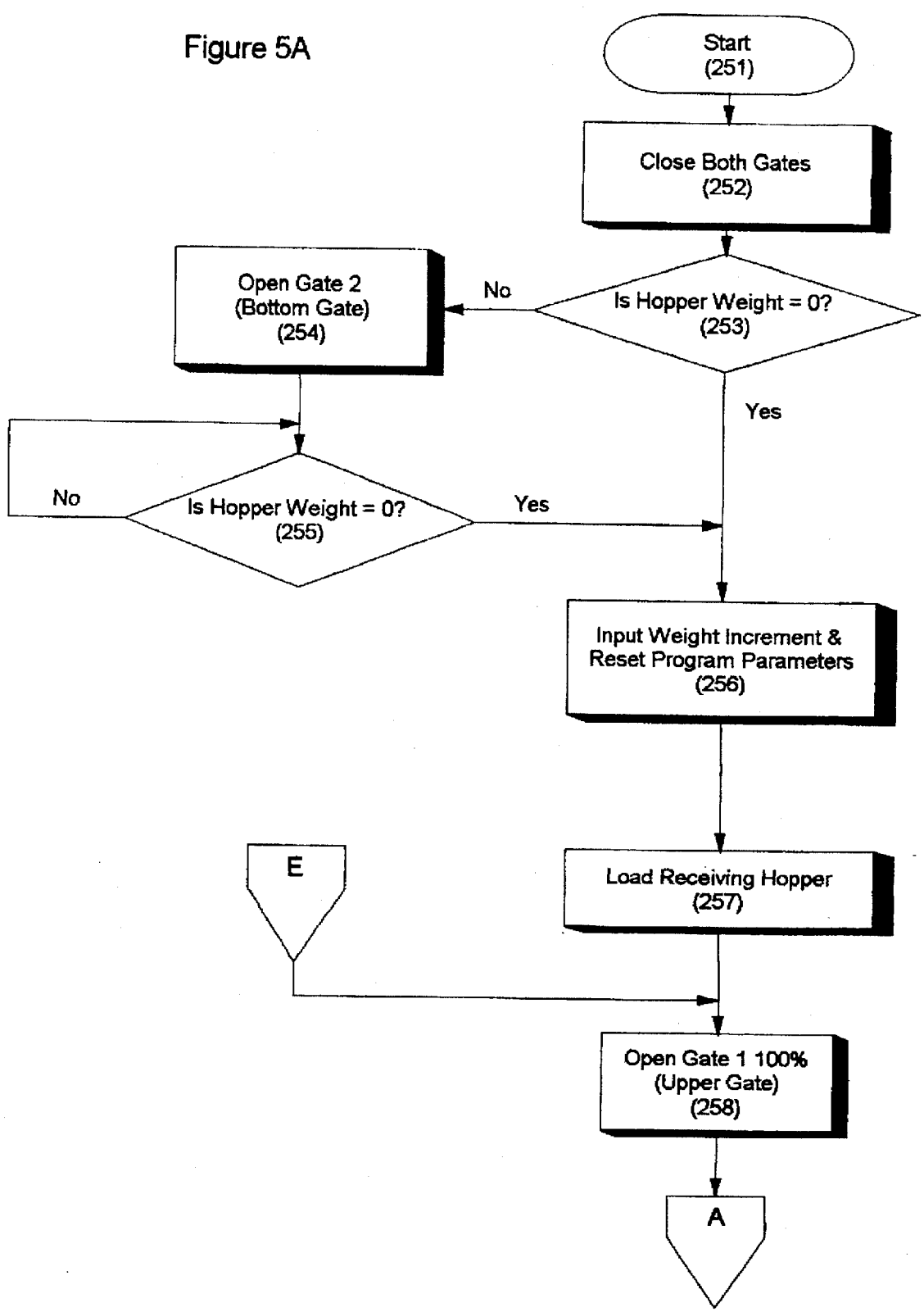

A flowchart representation of the foregoing operations is set forth in FIG. 5. The process begins at software block 251, and continues at software block 252, wherein the microprocessor actuates the valves to close both the upper gate and the lower gate. Then, in accordance with software block 253, the microprocessor monitors the weight of the material within the weighing hopper, in order to determine whether it is zero. If the weight is not zero, the process continues at software blocks 254 and 255, wherein the microprocessor opens the lower gate, and maintains it open until all of the material is discharged from the weighing hopper and the detected weight is zero. However, if it is determined in software block 253 that no material is within the weighing hopper, then the operations of software blocks 254, 255 are skipped, and the process continues at software block 256, wherein the microprocessor receives the operator established weight threshold (the "input weight"), and the program parameters are reset. Next, in accordance with software block 257, the receiving hopper is loaded with particulate matter. Then in accordance with software block 258, the upper gate is opened 100 percent to allow the material to be gravity fed fromt eh receiving hopper into the weighing hopper. Next, in accordance with software block 259, the microprocessor continually monitors the weight of the material within the weighing hopper, in order to determine whether it is 90 percent of the desired hopper weight (the "input weight" value). If the weight of the material within the weighing hopper is less than 90 percent of the input weight, the microprocessor receives sensory data to determine whether there is more material in the receiving hopper (or feed system which delivers material to the receiving hopper), in accordance with software block 260. If the microprocessor determines in accordance with step 260 that no more material remains to be weighed, the software jumps to step 267, which will be discussed herebelow. However, if it is determined that more material remains to be weighed, then the weighing and comparison operations of software block 259 are repeated. Once the weight of the particulate matter within the weighing hopper equals 90 percent of the input weight, the upper gate is choked a predetermined amount in accordance with software block 261. Then, in accordance with software block 262, the microprocessor continually receives measurements of the weight of the particulate matter within the weighing hopper, and determines whether or not it is equal to 99 percent of the input weight; if it is determined that the weight of the material is less than 99 percent of the input weight, in accordance with software block 263, the microprocessor determines whether there is more material to be weighed, and jumps to software block 267 if it is determined that no more material remains to be weighed. Once it is determined that the weight of the material within the weighing hopper is equal to 99 percent of the input weight, the process continues at software block 264, wherein the microprocessor actuates the valves in order to choke the upper gate a predetermined amount. Next, in accordance with software block 265, the weight of the material within the weighing hopper is continually monitored by the microprocessor to determine whether it is equal to 100 percent of the input weight. This process is performed by software block 265. Additionally, the microprocessor monitors to determine whether there is additional material that needs to be weighed, in accordance with software block 266. Once it is determined that the weight of the material within the weighing hopper is equal to 100 percent of the input weight, the upper gate is closed in accordance with software block 267. In accordance with software block 268, a very small time delay is introduced into the operation in order to allow for dampening of the system. In software block 269, the microprocessor updates the total weight delivered by adding the weight of the material within the hopper to the previous running total for the total weight delivered. Next, the material maintained within the weighing hopper is delivered, in accordance with software block 270, by opening of the lower gate. The microprocessor continually monitors the weight of the material within the hopper, in accordance with software block 271, in order to determine when the hopper is empty. Once it is determined that the hopper is empty, the lower gate is closed, in accordance with software block 273. If more material remains to be weighed, the software operations jump to step 256, in accordance with software block 274. However, if no additional material remains to be weighed, a customer report is generated, in accordance with software block 275, which prints out the total amount (weight) of material delivered during the weighing operation, and the operations end at software block 276.

The rotary throttling gate of the present invention may be utilized to provide accurate measures of the weight or mass of particulate matter passing through the weighing assembly, while maintaining a continuous flow of particulate matter through the weighing apparatus of FIG. 4, and without closure of either the upper or lower rotary throttling gates 207, 219. This continuous flow mode of operation can be obtained provided that (1) there is substantially unobstructed flow of the particulate matter through the weighing apparatus, and (2) assuming that the particulate matter will flow through two similar rotary throttling gates of the same diameter and specifications at the same rate. The operation of the weighing apparatus of FIG. 4 in accordance with the continuous flow mode of operation is set forth in flowchart form in FIGS. 6A and 6B. With respect to those figures, the following parameter descriptions are utilized:

1. Gate 1 is the upper gate;
2. Gate 2 is the lower gate;
3. The "hopper wt" is the weight measured in the hopper by the load cell;
4. The "timer" is a system timer, preferably a software timer;
5. The "flowrate" is at the calculated particulate matter flowrate;
6. The "maintain weight" is a weight maintained in the hopper while both the upper and lower gates are opened, and is used in determining the flowrate;
7. "$t_1$" is the time between opening the top gate and the time the hopper weight has reached the "maintain weight" threshold. This time is used in calculating the flowrate;
8. "$t_2$" is the time until the hopper has emptied, and is thus the elapsed flow time;
9. "$t_3$" is the total time the lower gate is open with material flowing, and is used to calculate the total weight;
10. The "total weight" is the total weight of the particulate matter.

Figure 6A:
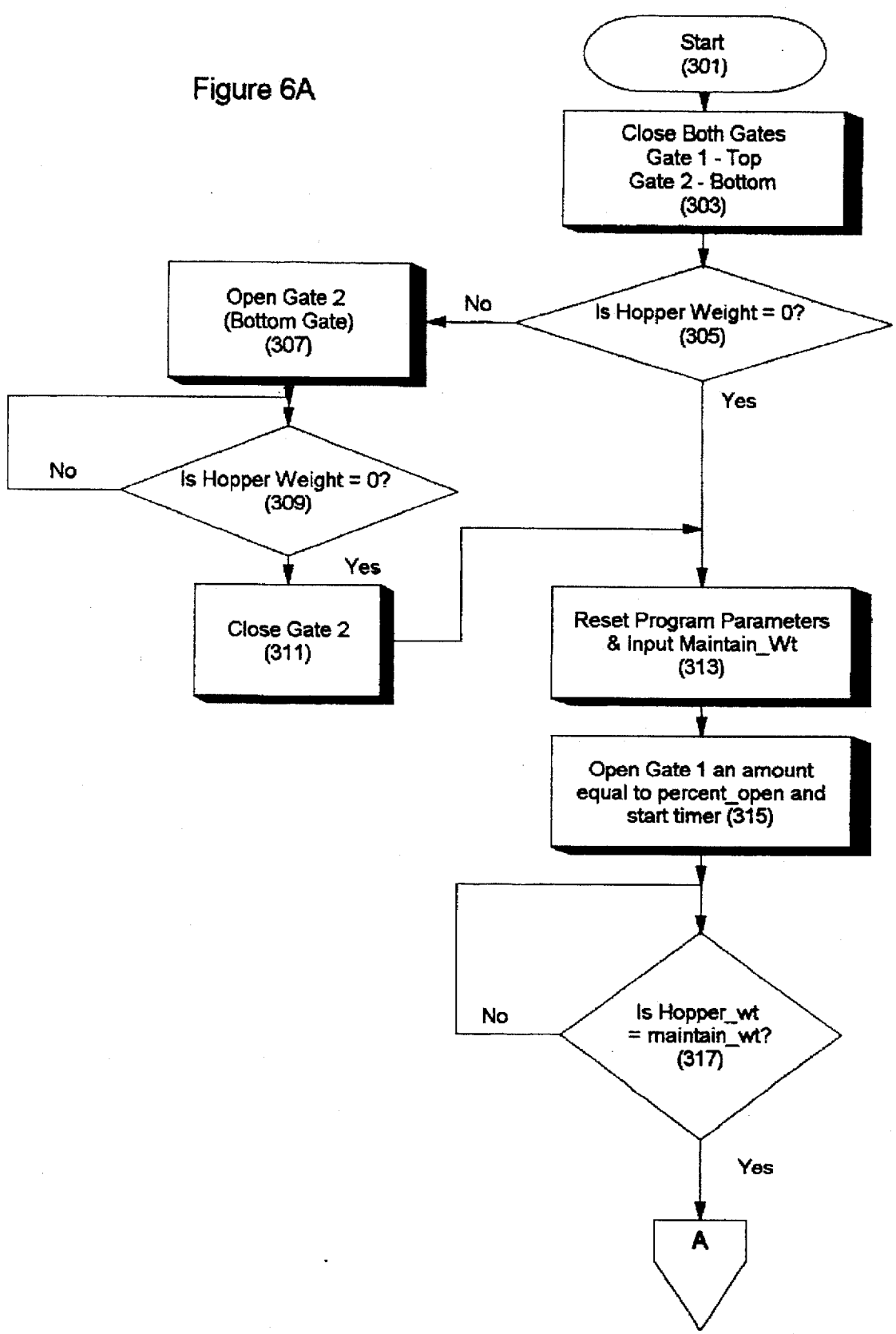
FIGS. 6A and 6B are a flowchart representation of a continuous flow operation which can be obtained utilizing rotary throttling gates of the present invention in a weighing hopper.
Figure 6B:
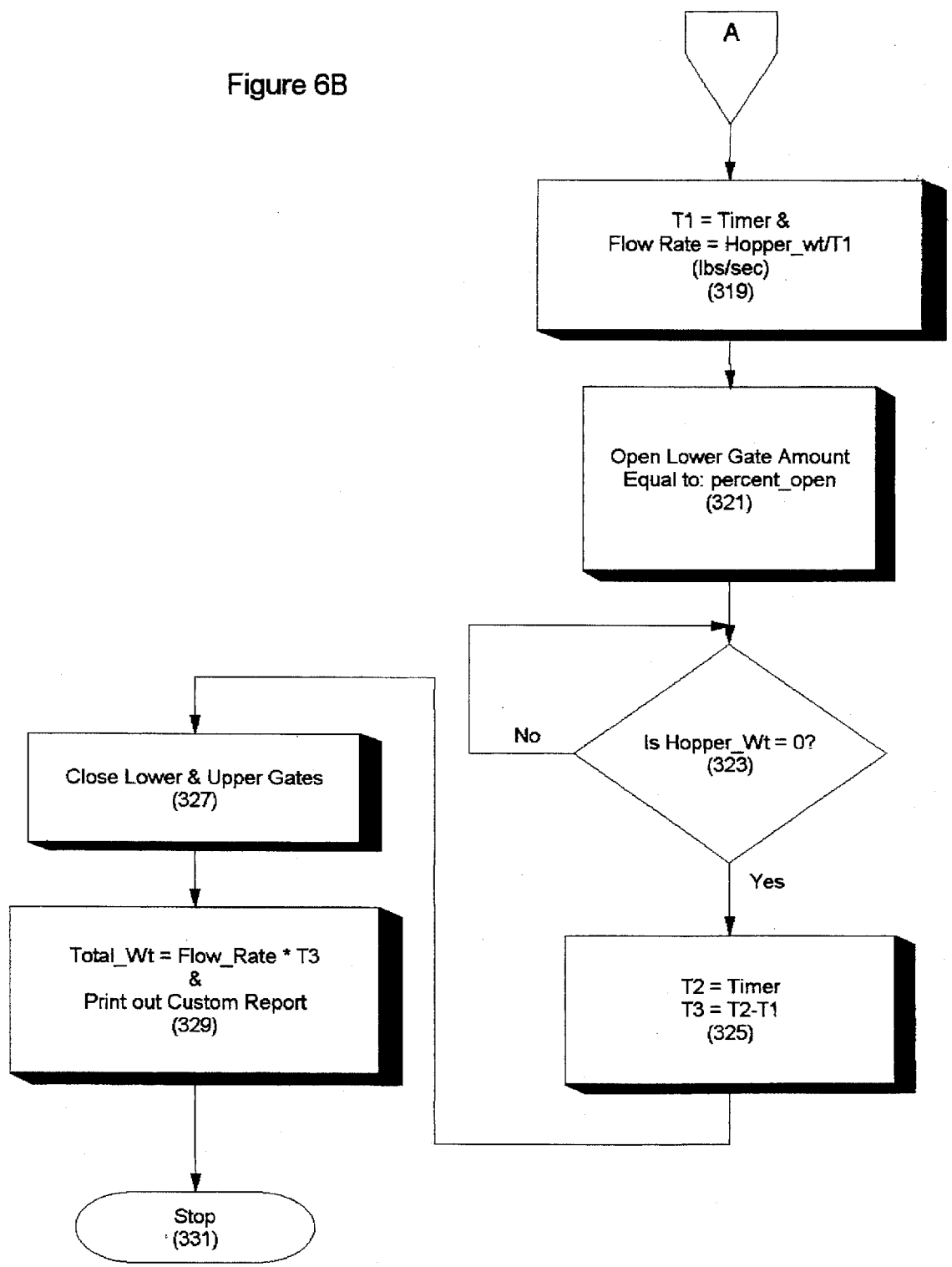

With reference now to FIGS. 6A and 6B, the continuous flow mode of operation will be described. The process starts at software block 301, and continues at software block 303, wherein both the upper and lower gates are closed. The process continues at software block 305, wherein the microprocessor monitors the scale to determine whether the hopper weight is equal to zero; if not, the process continues at software block 307, wherein the lower gate is opened, in order to discharge particulate matter remaining within the weight hopper, which is checked by the microprocessor in accordance software block 309, wherein the microprocessor monitors the scale to determine whether the hopper weight is equal to zero; if so, the process continues at software block 311, wherein the lower gate is closed.

The process continues at software block 313, wherein the program parameters are reset and an operator inputs the "maintain weight" weight threshold. Then, in accordance with software block 315, the top gate is opened by an amount equal to the parameter "percent open", and the software timer is started. Next, in accordance with software block 317, the microprocessor monitors the scale to determine whether the hopper weight equals the maintain weight value set by the operator; if not, the monitoring continues; if so, the process continues at software block 319, wherein the timer value for "$t_1$" is recorded in memory, and the flowrate in pounds per second is calculated as the hopper weight value divided by the value for $t_1$. Next, in accordance with software block 321, the lower gate is opened in an amount equal to "percent open". Then, the microprocessor monitors hopper weight to determine whether it is equal to zero; if not, the monitoring continues; if so, the process continues at software block 325, wherein the microprocessor records in memory a timer value for "$t_2$", and calculates "$t_3$" as the difference between $t_2$ and $t_1$. The process continues at software block 327, wherein the upper and lower gates are closed. Next, the microprocessor calculates the total weight as the value of the flowrate times the value of $t_3$, and prints out this value of the total weight delivered as a customer report. The process stops at software block 331.

In this manner, a very accurate value of delivered particulate matter may be obtained, while minimizing the opening and closing of the upper and lower gates.

Figure 7A:
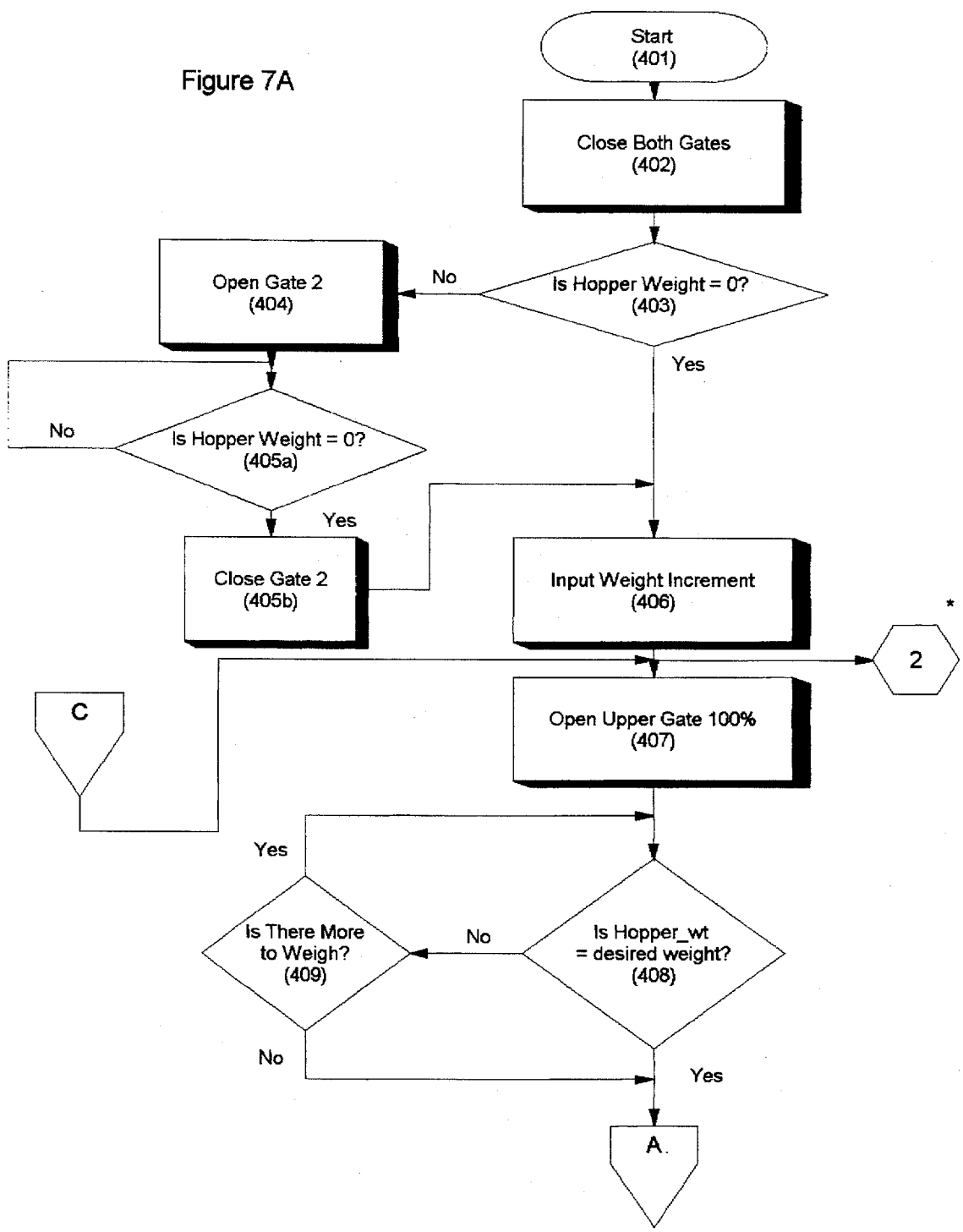
FIGS. 7A and 7B is a flowchart representation of one particular weighing operation.
Figure 7B:
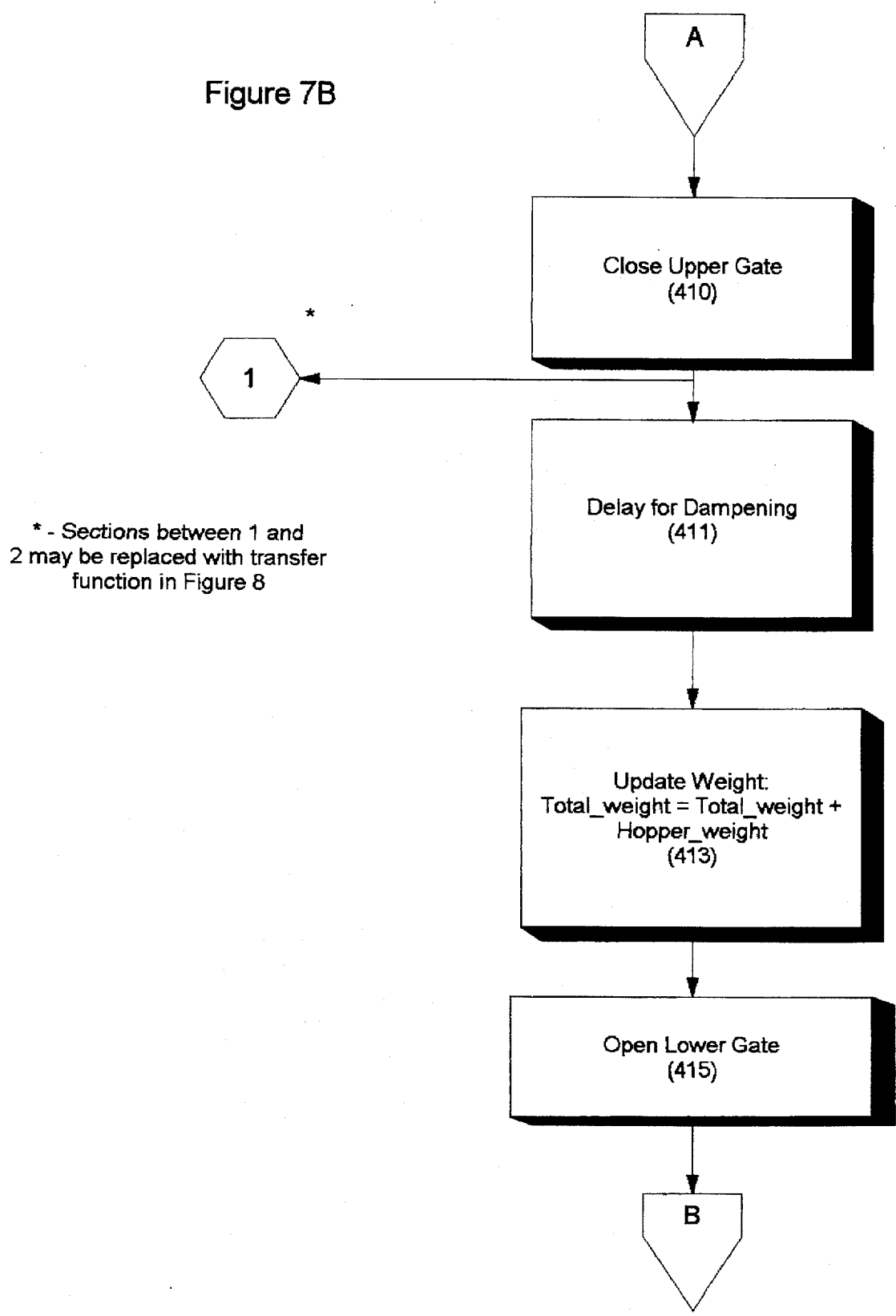
Figure 7C:
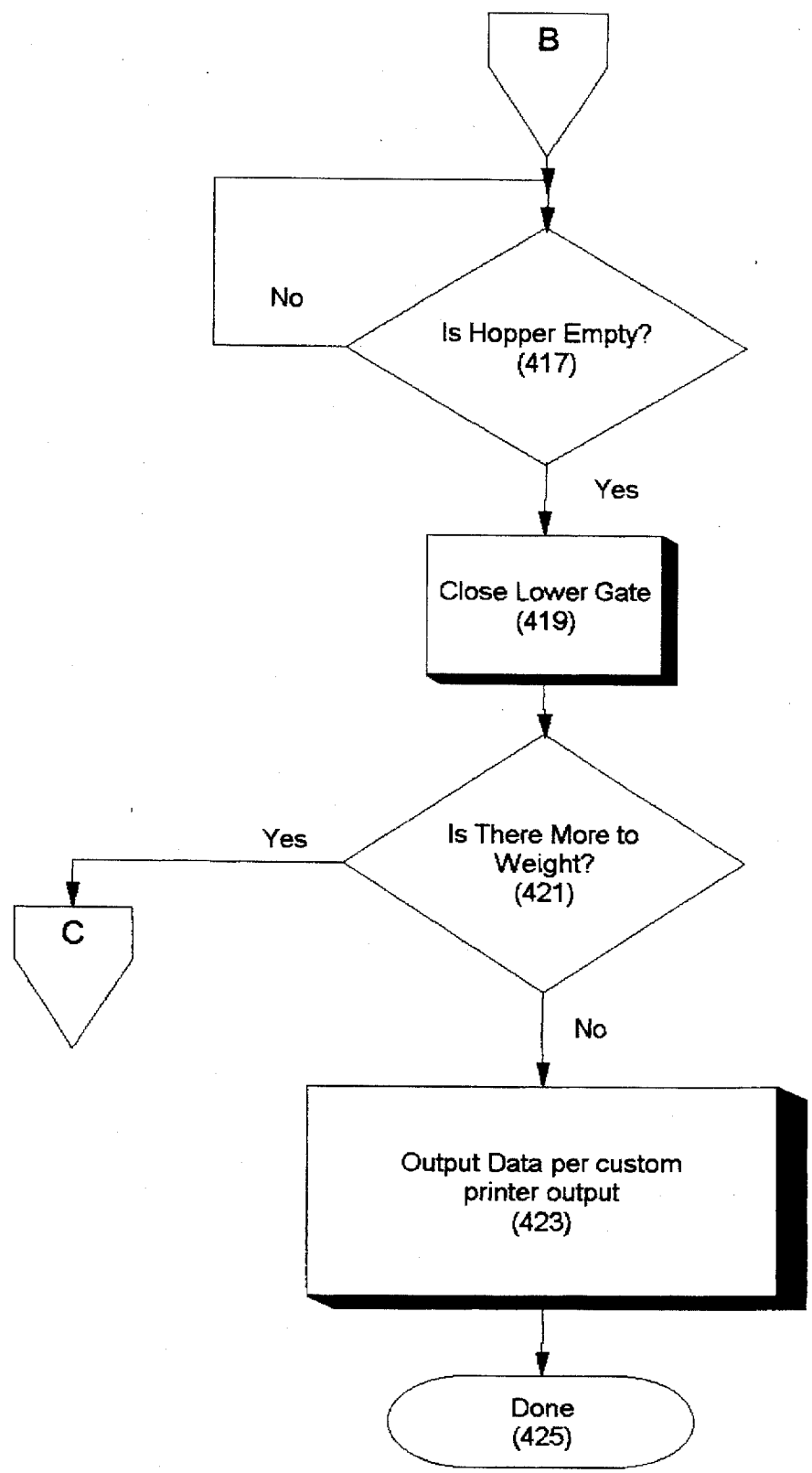

FIGS. 7A and 7B represent in flowchart form a more conventional weighing operation. In this operation, choking of the flow gates is not utilized, nor is the continuous flow algorithm discussed above utilized. Instead, the particulate matter is weighed and then individually discharged from the weighing apparatus. The process begins at software block 401, and continues at software block 402, wherein the microprocessor actuates the valves in order to close both the upper gate and the lower gate. Next, the microprocessor receives weighing data from the scale in order to determine whether the hopper has any particulate matter remaining within it, in accordance with software block 403. If the microprocessor determines that particulate matter remains within the weighing hopper, then the process continues at software block 404, wherein the microprocessor actuates the valves in order to open the lower gate. Once the lower gate is open, the microprocessor continually monitors the weight of the material within the weighing hopper, in accordance with software block 405a, and then closes the lower gate in accordance with software block 405b, and returns to software block 406. In software block 406, the microprocessor receives the input weight from the operator, which determines the total weight of particulate matter which is to be maintained within the weighing hopper. The process continues at software block 407, wherein the microprocessor opens the upper gate 100 percent. Then, in accordance with software block 408, and 409, the microprocessor continually monitors the weight of the material within the weighing hopper, for so long as it is determined that there is material being delivered to the receiving hopper; in other words, for so long as there is more material that needs to be weighed. The microprocessor compares the weight of the material within the weighing hopper to the input weight. Once the weight of the particulate matter within the hopper equals the desired hopper weight, the process continues at software block 410, wherein the upper gate is closed. In accordance with software block 411, a tiny delay is provided prior to closure of the upper gate in order to allow for dampening of the system. Then, in accordance with software block 413, the weight value of the particulate matter contained within the weighing hopper is added to a running total to maintain a record of the total weight. Next, in accordance with software block 415, the lower gate is opened by the microprocessor. This causes the particulate matter to be delivered to the intended receptacle (such as a truck, silo, or the like). Then, in accordance with software block 417, the microprocessor examines the signal from the scale to determine whether the hopper is empty; if not, monitoring operations continue, until it is determined that all the particulate matter has been discharged from the weighing apparatus. Once it is determined that all of the particulate matter has been discharged, the process continues at software block 419 wherein the lower gate is closed. Then, in accordance with software block 421, the microprocessor determines whether there is more material that needs to be weighed, if so, the process continues at software block 407; if not, the process continues at software block 423, wherein the output of the total weight is provided, preferably in print-out form, and the process ends at step 425.

Figure 8:
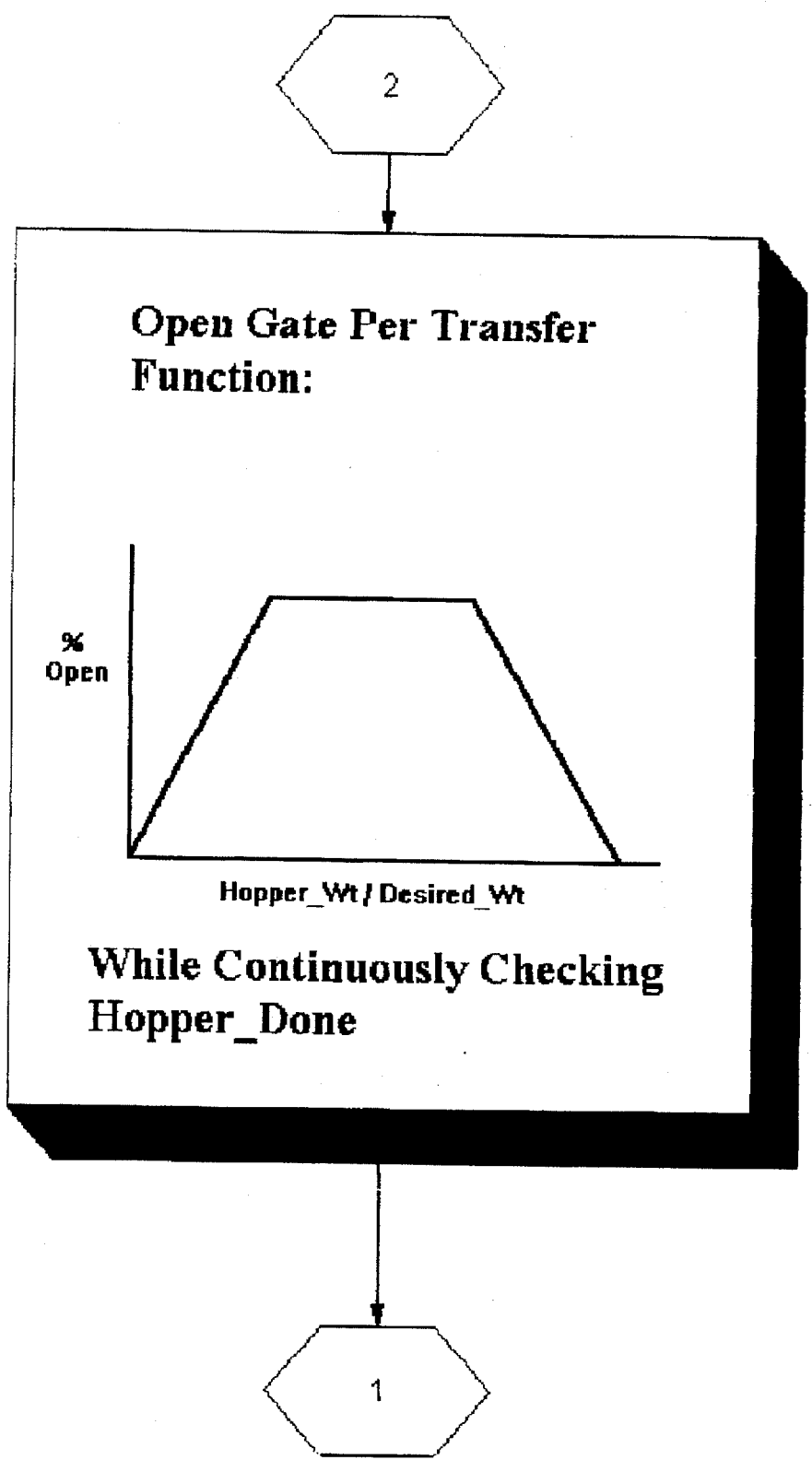
FIG. 8 is a flowchart representation of a particular transfer function.

As an alternative to the staged choking operations of FIG. 5, the microprocessor of the weighing apparatus may be programmed with a particular valve transfer function, such as that depicted in FIG. 9. This transfer function maps the percentage of openness of the upper gate (on the y-axis) to the percentage of the weight of the particulate matter in the weighing hopper relative to a desired weight (on the x-axis). Note that, as the weight of the particulate matter within the weighing hopper approaches one hundred percent of the desired weight, the upper gate is incrementally closed from a one hundred percent opened condition to a one hundred percent closed condition. The utilization of a program transfer function to incrementally open and close one or more flow gates may be utilized in all three of the software routines discussed above in connection with FIGS. 5, 6A, 6B, 7A, and 7B. This operation is depicted as a software step in the view of FIG. 8 which requires the opening and closing of a particular gate in accordance with a particular transfer function, while continually monitoring the hopper weight.

The ability to control the flow of particulate matter in accordance with simple or sophisticated transfer functions is one significant advantage of the present invention over prior art devices. It is believed that the throughput of weighing devices can be increased dramatically utilizing the present invention, without sacrificing accuracy. It is believed that the improved flow gates can in fact greatly increase the accuracy of weighing devices.

While the invention has been shown in only one of its forms, it is not thus limited but is susceptible to various changes and modifications without departing from the spirit thereof.

What is claimed is:

1. A flow gate for regulating flow rates of particulate matter, comprising:

(a) a generally cylindrical body defining a flow path having an inlet and an outlet;

(b) a stator member fixed in position relative to said generally cylindrical body, having a plurality of alternating tapered vane portions and inlet port portions;

(c) a rotor member interfacing with said stator member and having a plurality of alternating stop portions and outlet port portions;

(d) a rotary coupling between said rotor member and at least said stator member;

(e) a motorized position actuator receiving at least one control input and producing a corresponding displacement;

(f) a mechanical coupling between said position actuator and said rotor member; and (g) wherein a particular flow rate within a range of available flow rates is obtained by providing a particular control input to said position actuator which in turn locates the relative positions of said inlet ports of said stator member and said outlet ports of said rotor member.

2. A flow gate according to claim 1, wherein:

said position actuator and said mechanical coupling operate to translate linear movement into rotational movement of said rotor member.

3. A flow gate according to claim 1, wherein:

said position actuator and said mechanical coupling operate to translate linear movement of an operating rod into a rotational movement of said rotor member.

4. A flow gate according to claim 1, wherein:

said position actuator comprises one of the following: (1) a piston and cylinder, or (2) an electrical motor assembly.

5. A flow gate according to claim 1, wherein:

said tapered vane portions of said stator member are substantially triangular in cross-section.

6. A flow gate according to claim 1, wherein:

said tapered vane portions of said stator member operate to direct flow and to transfer loads from said particulate matter to said generally cylindrical body.

7. A flow gate according to claim 1, wherein:

said tapered vane portions of said stator member operate to transfer loads from a center support hub which includes said rotary coupling to said generally cylindrical body.

8. A flow gate according to claim 1, wherein:

each of said stops of said rotor member are generally triangular in shape.

9. A flow gate according to claim 1, further including:

a plurality of roller bearings located at a perimeter of said generally cylindrical body for engaging said rotor member in a forced transference coupling while allowing rotational movement of said rotor member.

10. A flow gate according to claim 1, wherein:

each of said plurality of inlet port portions of said stator member are generally trapezoidal in shape.

11. A flow gate according to claim 10, wherein:

for each inlet port portion, an inner edge and an outer edge are curved in shape.

12. A flow gate according to claim 1, wherein:

each of said plurality of outlet port portions of said rotor member are generally trapezoidal in shape.

13. A flow gate according to claim 11, wherein:

for each outlet port portion, an inner edge and an outer edge are curved in shape.

* * * * *